United States Patent [19]

Price, II

[11] 4,325,225
[45] Apr. 20, 1982

[54] ELECTRONIC TEMPERATURE CONTROL
[75] Inventor: David L. Price, II, Huntsville, Ala.
[73] Assignee: Eaton Corporation, Cleveland, Ohio
[21] Appl. No.: 172,501
[22] Filed: Jul. 28, 1980
[51] Int. Cl.³ .......................... F25B 1/00; F25B 49/00
[52] U.S. Cl. ........................................ 62/229; 62/132; 62/180; 236/78 D
[58] Field of Search .................. 361/165; 62/132, 180, 62/229; 236/78 R, 78 D; 165/26

[56] References Cited
U.S. PATENT DOCUMENTS 3,398,889 8/1968 Bohannan .......................... 62/180 X
4,240,077 12/1980 Hughes et al. ..................... 165/26 X Primary Examiner—William E. Wayner
Attorney, Agent, or Firm—C. H. Grace; M. L. Union

[57] ABSTRACT

An electronic temperature control having a temperature sensor (10) and a user-adjustable temperature range control (12). A difference amplifier (14) amplifies the difference between the signals from the temperature sensor and range control. A hysteresis comparator (16) then accepts the signal from the difference amplifier and uses it to control a transistor relay driver (18), which in turn controls the clutch coil (20) of the air conditioning system controlled by the temperature control. The transistor relay driver is disabled by an evaporator fan sensor (22) to avoid freeze-up of the evaporator when the fan is turned off. Since auto air conditioning systems rob the car's engine of power, an acceleration cut-out (24) is provided to disable the transistor relay driver when other power demands on the car's engine are great, such as on hard acceleration.

9 Claims, 3 Drawing Figures

ELECTRONIC TEMPERATURE CONTROL

BACKGROUND OF THE INVENTION

This invention relates to electronic thermostatic controls, such as for controlling automotive air conditioning systems and like applications, and in particular to such thermostatic controls which sense engine power demands and the state of the evaporator fan in addition to temperature.

Solid state temperature control means are known in the art. For example, Speaker, U.S. Pat. No. 3,544,849, issued Dec. 1, 1970, discloses such a control means. The circuits there disclosed, however, have a very narrow temperature differential, and are very sensitive to component tolerance variations due to the delicate electronic balancing of the differential circuit. Improvements are thus necessary in order to make such a circuit amenable to broader applications.

SUMMARY OF THE INVENTION

This invention involves a temperature sensor and an adjustable range control which are connected to a difference amplifier. The output of the difference amplifier is put through a hysteresis comparator into a transistor relay driver which controls the air conditioner system clutch coil. Also controlling the transistor relay driver are the evaporator fan sensor and the acceleration cutout.

An object of this invention is to provide an electronic thermostatic switch, such as for controlling automotive air conditioning systems, which has improved temperature calibration and improved control of the temperature differential over the temperature control span of the circuit.

Another object of the invention is to provide an electronic thermostatic switch as described above which senses the operation of the evaporator fan and deactivates the compressor when the fan is not operating to avoid freeze-up of the evaporator.

Another object of the invention is to provide an electronic temperature control as described above which deenergizes the air conditioner clutch coil when the load on the engine is greater than normal.

A more specific object of the invention is to provide an electronic temperature control as described above wherein the temperature sensing function is isolated from the output section to prevent interaction of the output and the temperature differential of the control.

Another specific object of the invention is to provide an electronic temperature control wherein the electronic components are well protected from transients.

Other objects and advantages of the instant invention will appear hereinafter.

DESCRIPTION OF THE PREFERRED EMBODIMENT

Figure 1:
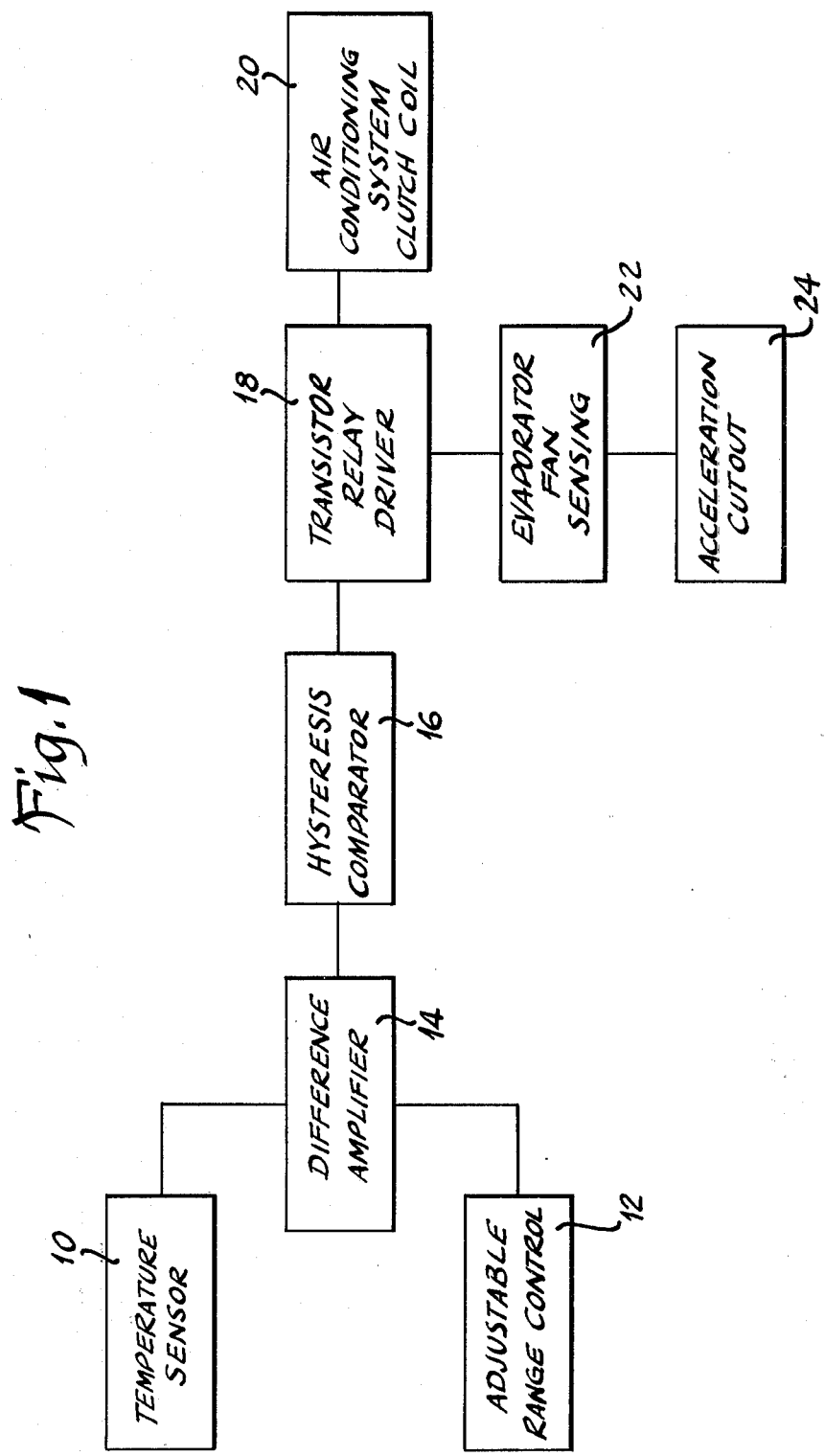
FIG. 1 is a block diagram of a circuit embodying the instant invention.

Referring to FIG. 1, the electronic temperature control includes a temperature sensor section 10 and an adjustable range control 12, which input information into a difference amplifier 14. Temperature sensor 10 inputs information as to the ambient temperature in the space wherein the temperature is to be controlled, such as the interior of an automobile. Range control 12, which is controlled by the user, inputs information as to the temperature desired by the user in the controlled space.

Difference amplifier 14 then determines whether there is a difference between the desired temperature and the actual temperature, and passes this information on to a hysteresis comparator 16. If this difference in temperature is greater than a predetermined amount, comparator 16 energizes a transistor relay driver 18, which in turn energizes an air conditioning system clutch coil 20, in order to have the auto air conditioner bring the actual temperature closer to the temperature desired by the user.

An evaporator fan sensing section 22 disables transistor relay driver 20 and thus the air conditioner whenever the evaporator fan is not turned on, to prevent freeze-up of the evaporator. An acceleration cut-out 24 also disables driver 20, whenever the load on the engine reaches a predetermined level, such as on hard acceleration.

Figure 2:
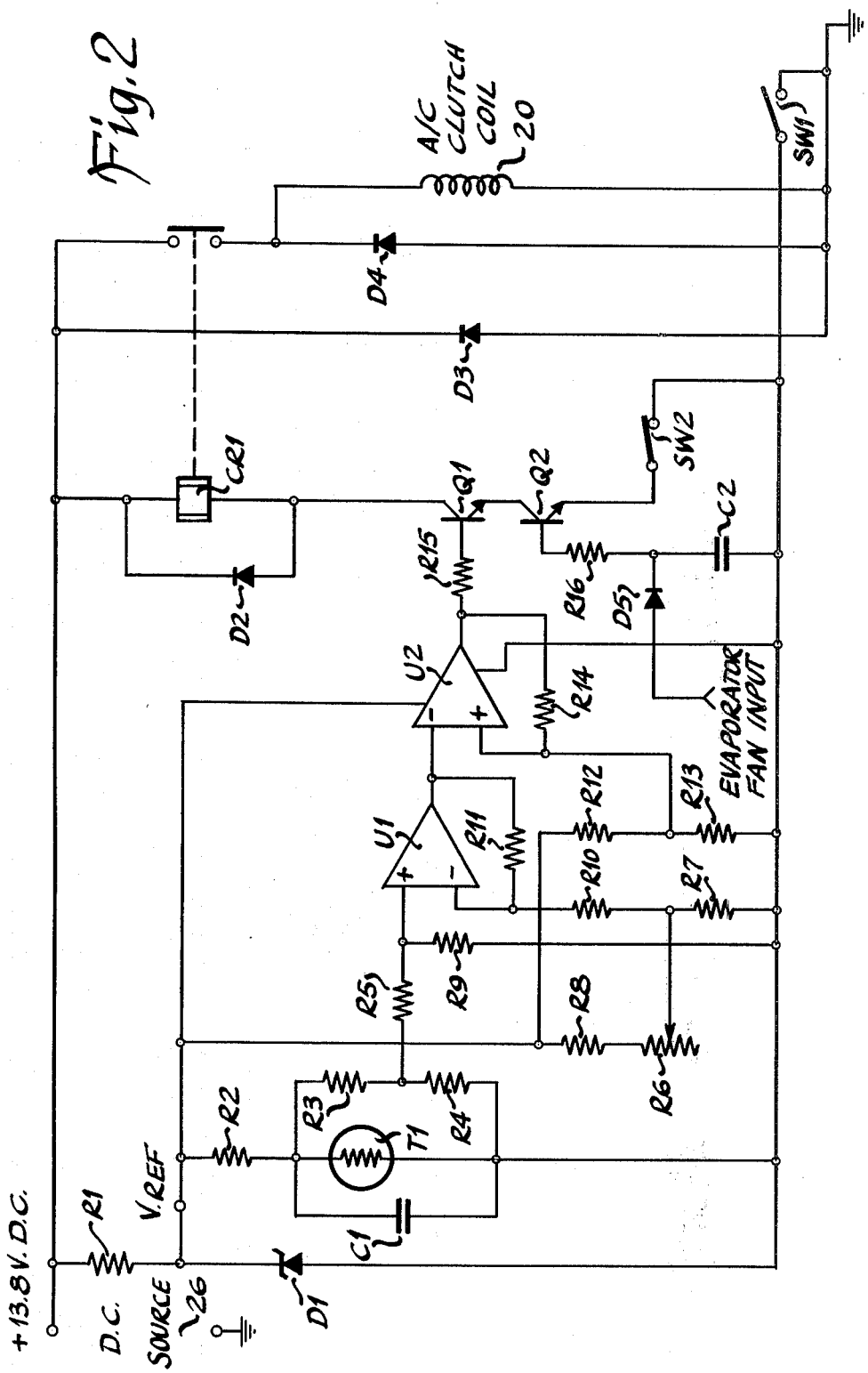
FIG. 2 is a diagrammatic view of a circuit embodying the invention.

FIG. 2 shows a circuit embodying the instant invention. The D.C. source 26 there shown could be the electrical system of an automobile, in which case the source voltage would be about 13.8 volts, varying depending upon the loads on the system. In order to provide the logic circuits with a stable "HIGH" reference voltage $V_{ref}$, a resistor R1 and a zener diode D1 are series-connected across voltage source 26. Thus a constant reference voltage of approximately 9.1 volts, roughly the zener voltage of diode D1, is provided.

The temperature sensor section 10 includes resistors R2, R3 and R4, capacitor C1, and thermistor T1. Thermistor T1 is a negative temperature coefficient (NTC) thermistor, meaning that the value of its resistance decreases as its temperature increases. Thermistor T1 is placed in the space where the temperature is being controlled, so that its resistance varies according to that temperature. Resistor R2 and thermistor T1 divide the reference voltage, with the proportion of voltage appearing across the thermistor varying with its resistance. The voltage appearing across thermistor T1 is further divided across resistors R3 and R4. These resistors, along with resistor R2, help linearize the output of the thermistor. Capacitor C1 is connected in parallel with the thermistor to suppress impulse noise and transients. The output of the temperature sensor section is fed into the non-inverting input of an operational amplifier (op amp) U1, that is, an amplifier which amplifies the difference of its input signals, through a resistor R5.

The range control section 12 includes an adjustable resistor R6 and two fixed-value resistors R7 and R8. The resistance value of resistor R6 can be adjusted by the user in order to set the temperature desired. The adjustable connection of resistor R6 is connected through resistor R7 to logic "LOW", which is connected to the car system ground through switch SW1. Resistor R8, connected in series with resistor R6, sets the lowest temperature to which the control can be adjusted, while resistor R7 sets the upper temperature limit. Resistor R6 varies the temperature adjustment within these limits.

The difference amplifier 14 includes op amp U1 and resistors R5, R9, R10 and R11. As previously stated, the junction between resistors R3 and R4 is connected through resistor R5 to the non-inverting input of op amp U1. This same op amp input is connected to logic "LOW" through resistor R9. The adjustable connection of resistor R6 is connected through resistor R10 to the inverting input of op amp U1. Resistor R11 provides feedback from the output of the op amp to the inverting input. The function of the difference amplifier is to measure the difference between the output of the temperature sensor and the output of the range control, and to amplify that difference. If, for example, the voltage from the temperature sensor is lower than the voltage from the range control, as will be the case if the temperature in the car is warmer than that desired by the user, the output of the op amp will be low.

The output of op amp U1 is connected to the inverting input of another op amp U2. Op amp U2 combines with resistors R12, R13 and R14 to form the hysteresis comparator 16. Resistors R12 and R13 are connected in series between $V_{ref}$ and logic LOW. The junction between these two resistors is connected to the non-inverting input of U2. Resistor R14, connected between the output of U2 and the non-inverting input, provides feedback for the op amp. When the output voltage from op amp U1 rises to a predetermined level above the constant voltage supplied to the non-inverting input of op amp U2, then the output voltage of U2 switches from a higher to a lower level. It remains in this state until the input voltage at the inverting input drops to a predetermined level below the voltage supplied to the non-inverting input. At that time it switches from a lower to a higher level. Thus if the output of op amp U1 is low, as in the example above, the output of op amp U2 will be high.

Included in the transistor relay driver 18 are a transistor Q1, a resistor R15, a relay CR1 and a diode D2. The output of op amp U2 is fed into the base of transistor Q1 through current-limiting resistor R15. The collector of the transistor is connected to the coil of relay CR1, which in turn is connected to the D.C. source 26. Diode D2 is connected in parallel with the coil to provide a path for current transients from the coil when the transistor is switched to its non-conducting state. The contacts of relay CR1 are connected in series between source 26 and air conditioning clutch coil 20. Thus, to continue the example given above, if the output of the op amp U2 is high, current will flow into the base of transistor Q1, switching it to its conductive state, which in turn energizes relay CR1 and finally energizes clutch coil 20 to turn on the air conditioning system. This result follows from the initial assumption of the example, wherein the temperature at the thermistor T1 was higher than that desired by the user as indicated in the range control 12.

Diode D3 and D4 provide further protection from inductive negative voltage spikes by shunting the transients into voltage source 26.

The evaporator fan sensing section 22 is an added feature to prevent freeze-up of the evaporator when the fan is not turned on. This section includes a transistor Q2, a resistor R16, a rectifying diode D5 and a capacitor C2. The collector of transistor Q2 is connected to the emitter of transistor Q1, while the base of Q2 is connected through resistor R16 and capacitor C1 to logic LOW. The junction between the resistor and capacitor is connected to the cathode of diode D5, while the anode of D5 is connected to the fan input. Thus the two transistors are in effect two switches connected in series, both of which must be conductive for current to flow. In most American cars, when the fan is off the input will be at ground voltage, and hence no current will flow into the base of transistor Q2, leaving that transistor non-conductive. The energization of relay CR1 will then be inhibited, regardless of the temperature settings, until the evaporator fan is turned on. Capacitor C2 is a filter capacitor.

The accelerator cut-out is a vacuum switch SW2 which is in effect a third switch connected in series with the two transistors such that all three must be conductive in order for relay CR1 to be energized. Switch SW2 measures manifold vacuum in the intake manifold of the car's engine. The switch is normally closed, and opens when the pressure in the manifold drops below a predetermined level, such as on hard acceleration.

Thus relay CR1 will be deenergized on the occurrence of any one of three events: (1) The temperature is at or below that desired by the user, (2) The evaporator fan is not turned on, (3) The car's engine is under a relatively heavy load.

Figure 3:
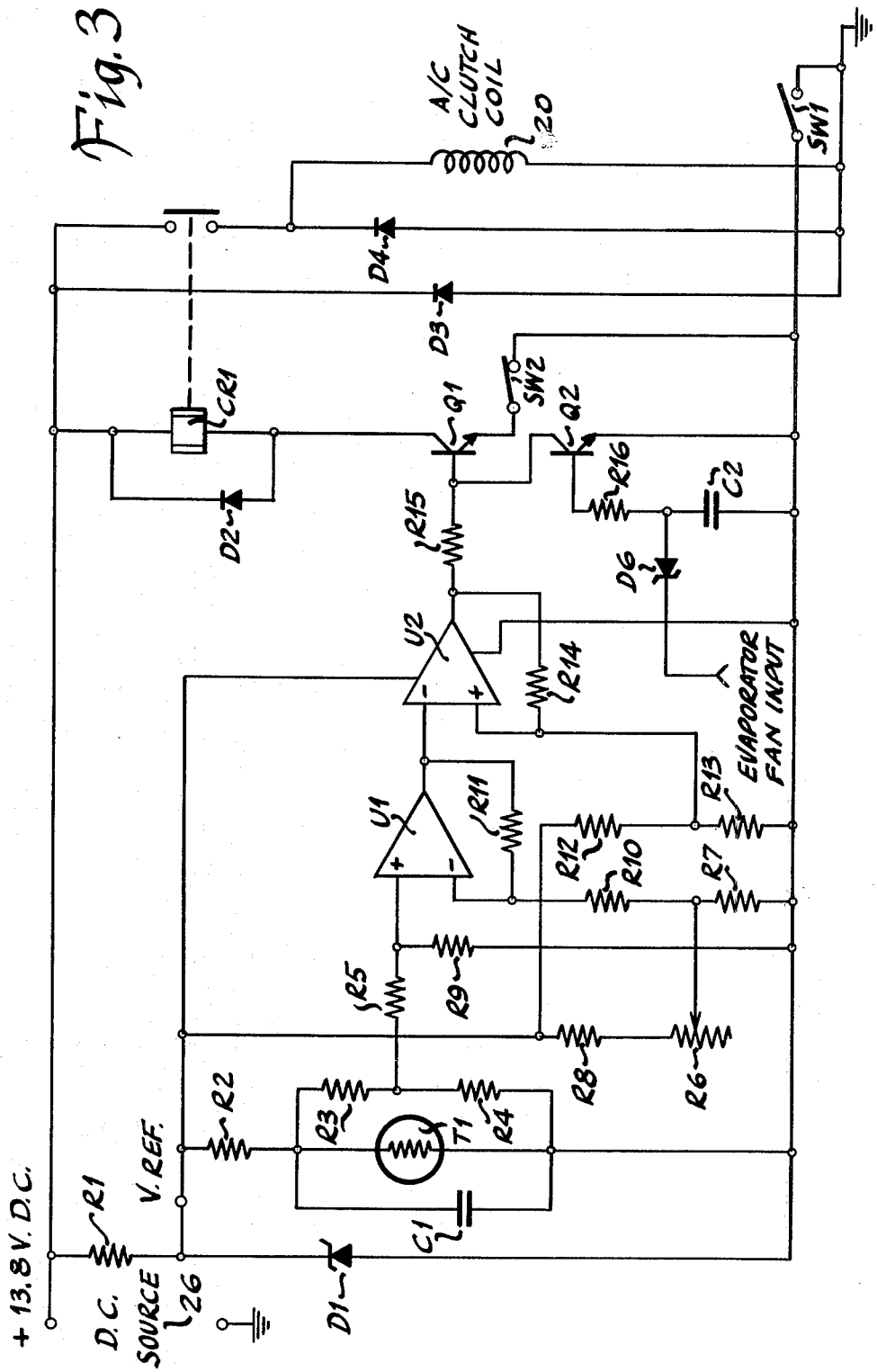
FIG. 3 is a diagrammatic view of a circuit embodying an alternative form of the invention.

FIG. 3 shows an alternative embodiment of the invention adapted to an evaporator fan input which is at D.C. source voltage (e.g. 13.8 VDC) instead of at ground voltage when the fan switch (not shown) is in the "off" position. The electrical systems of most foreign cars are arranged in this manner.

In this circuit diode D5 is replaced by zener diode D6, which is connected in a reverse-biased configuration. Thus current flows into the base of transistor Q2 only when the voltage at the input is above a predetermined level, that is, when the fan switch is in the "off" position. Further, the collector of transistor Q2 is not connected to the emitter of transistor Q1, but rather to the base of Q1, so that, when the fan input voltage is high, the base current of Q1 is drained off, preventing Q1 from energizing relay CR1. Vacuum switch SW2 is connected in series with transistor Q1 to give the same acceleration cut-out effect as described for it in FIG. 2. Other than these differences, the components of the circuits shown in FIGS. 2 and 3 perform the same functions and are assigned the same reference numerals.

While the circuits hereinbefore described are effectively adapted to fulfill the aforesaid objects, it is to be understood that the invention is not intended to be confined to the particular preferred embodiments herein set forth, inasmuch as they are susceptible of various modifications without departing from the scope of the appended claims.

I claim:

1. In an air conditioning system for controlling the temperature in an enclosed space, including an evaporator, an evaporator fan, and an evaporator fan switch having at least an "on" position and an "off" position, an electronic temperature control comprising:

means for sensing and indicating the ambient temperature of the enclosed space;

adjustable means for indicating the range of temperature desired to be maintained in the enclosed space;

means for amplifying the difference between the indications from said sensing means and said adjustable means, the output of said amplifying means being at a greater voltage when the ambient temperature is lower than the desired temperature and at a lesser voltage when the ambient temperature is higher than the desired temperature;

a hysteresis compactor for comparing said output of said amplifying means to a predetermined voltage, switching its output to a lower level when said output of said amplifying means reaches a predetermined level above said predetermined voltage, and switching its output to a higher level when said output of said amplifying means reaches a predetermined level above said predetermined voltage, and switching its output to a higher level when said output of said amplifying means reaches a predetermined level below said predetermined voltage;

means for energizing the air conditioning system when said output of said hysteresis comparator switches to said higher level, and for deenergizing the air conditioning system when said output switches to said lower level; and first disabling means for disabling said energizing means when the evaporator fan switch is in the "off" position, such that the air conditioning system cannot be energized when the fan is not operating.

2. A temperature control as recited in claim 1 further comprising second disabling means for disabling said energizing means whenever other demands on the source of energy of the air conditioning system exceed a predetermined level.

3. A temperature control as recited in claim 2 wherein said sensing means includes a thermistor the resistance of which, and hence the voltage across which, varies according to the temperature in the enclosed space, the indication of temperature given by said sensing means being a proportion of the voltage across said thermistor.

4. A temperature control as recited in claim 3 wherein said energizing means includes a relay, having a coil and a set of contacts, and semiconductor switching means connected in series with said coil and having a control terminal connected to the output of said hysteresis comparator, such that when the output of said hysteresis comparator switches to said higher level, said switching means is made conductive, energizing said coil which in turn closes said set of contacts and energizes the air conditioning system.

5. A temperature control as recited in claim 4 wherein the voltage at the evaporator fan is at ground level when the evaporator fan switch is in the "off" position, and wherein said first disabling means comprises a second semiconductor switching means, the control terminal of which is connected to the fan switch, and the main terminals of which are connected in series with the main terminals of said first semiconductor switching means.

6. A temperature control as recited in claim 4 wherein the voltage at the evaporator fan switch is at voltage supply level when the switch is in the "off" position, and wherein said first disabling means comprises a second semiconductor switching means, the control terminal of which is connected to the fan switch, and the main terminals of which are connected between the control terminal of said first semiconductor switching means and ground, such that any current sent to said control terminal by said hysteresis comparator is drained through said second switching means rather than making said first switching means conductive.

7. A temperature control as recited in claim 5 or claim 6 wherein said amplifying means includes an operational amplifier having an inverting input and a non-inverting input, said sensing means being connected to said non-inverting input and said adjustable means being connected to said inverting input.

8. A temperature control as recited in claim 7 wherein said hysteresis comparator includes an operational amplifier having an inverting input and a non-inverting input, said output of said amplifying means being connected to said inverting input.

9. In an air conditioning system for controlling the temperature in an enclosed space, including an evaporator, an evaporator fan, and an evaporator fan switch having at least an "on" position and an "off" position, an electronic temperature control comprising:

means for sensing and indicating the ambient temperature of the enclosed space;

adjustable means for indicating the range of temperature desired to be maintained in the enclosed space;

means for amplifying the difference between the indications from said sensing means and said adjustable means;

hysteresis comparator for comparing said output of said amplifying means to a predetermined voltage, switching its output to a first level when said output of said amplifying output of said amplifying means reaches a predetermined level below said predetermined voltage;

means for energizing the air conditioning system when said output of said hysteresis comparator switches to one of said first and second levels, and for deenergizing the air conditioning system when said output switches to the other of said first and second levels; and disabling means for disabling said energizing means when the evaporator fan switch is in the "off" position, such that the air conditioning system cannot be energized when the fan is not operating.

* * * * *